US012600157B2

(12) United States Patent
Litman et al.

(10) Patent No.: US 12,600,157 B2
(45) Date of Patent: Apr. 14, 2026

(54) PRINTING COMPOSITIONS AND METHODS THEREFOR

(71) Applicant: Cryovac, LLC, Charlotte, NC (US)

(72) Inventors: Stanley Litman, Amherst, NY (US); Tom Huang, East Amherst, NY (US); Morgan Ashley Edwards, East Amherst, NY (US); Lawrence Albe Pilon, Hamburg, NY (US); Kevin John Hook, Grand Island, NY (US)

(73) Assignee: Cryovac, LLC, Charlotte, NC (US)

( * ) Notice: Subject to any disclaimer, the term of this patent is extended or adjusted under 35 U.S.C. 154(b) by 49 days.

(21) Appl. No.: 17/910,404

(22) PCT Filed: Mar. 11, 2021

(86) PCT No.: PCT/US2021/021810
§ 371 (c)(1),
(2) Date: Sep. 9, 2022

(87) PCT Pub. No.: WO2021/183710
PCT Pub. Date: Sep. 16, 2021

(65) Prior Publication Data
US 2024/0010019 A1 Jan. 11, 2024

Related U.S. Application Data

(60) Provisional application No. 62/988,618, filed on Mar. 12, 2020.

(51) Int. Cl.
*B41M 5/00* (2006.01)
*B41M 7/00* (2006.01)
(Continued)

(52) U.S. Cl.
CPC ........ *B41M 5/0047* (2013.01); *B41M 5/0064* (2013.01); *B41M 7/009* (2013.01);
(Continued)

(58) Field of Classification Search
CPC ...................................................... C09D 11/30
See application file for complete search history.

(56) References Cited

U.S. PATENT DOCUMENTS

| | | | |
|---|---|---|---|
| 3,450,791 A | 6/1969 | Sekmakas et al. | |
| 5,091,444 A | 2/1992 | Bauer et al. | |
(Continued)

FOREIGN PATENT DOCUMENTS

| | | |
|---|---|---|
| EP | 2927287 | 10/2015 |
| WO | 2017193039 | 11/2017 |
| WO | 2018156195 | 8/2018 |

OTHER PUBLICATIONS

Chemical Characterisation of Polyurethanes, May 14, 2018.
(Continued)

*Primary Examiner* — Shelby L Fidler
(74) *Attorney, Agent, or Firm* — Jason R. Womer

(57) ABSTRACT

According to one aspect, a printing composition of the present application comprises from about 10.00% to about 14.00% by weight of a pigment, from about 3.00% to about 7.00% by weight of a polymer, from about 15.00% to about 19.00% by weight of a co-solvent, from about 0.20% to about 0.40% by weight of a surfactant, and water.

13 Claims, 9 Drawing Sheets

(51) Int. Cl.
      *C09D 11/322*        (2014.01)
      *C09D 11/38*        (2014.01)
(52) U.S. Cl.
      CPC ............ *C09D 11/322* (2013.01); *C09D 11/38*
            (2013.01); *B41M 2205/12* (2013.01); *C08L*
                            *2201/54* (2013.01)

(56)                References Cited

U.S. PATENT DOCUMENTS

| | | | |
|---|---|---|---|
| 5,352,283 | A | 10/1994 | Beach et al. |
| 5,397,387 | A | 3/1995 | Deng et al. |
| 5,453,122 | A | 9/1995 | Lyor |
| 5,556,925 | A | 9/1996 | Kousaka et al. |
| 5,652,286 | A | 7/1997 | Deng |
| 5,744,519 | A | 4/1998 | Heraud et al. |
| 5,760,123 | A | 6/1998 | Vogt-Birnbrich et al. |
| 5,800,601 | A | 9/1998 | Zou et al. |
| 5,814,701 | A | 9/1998 | Catena et al. |
| 5,825,391 | A | 10/1998 | Yang |
| 5,874,488 | A | 2/1999 | Wang et al. |
| 5,958,169 | A | 9/1999 | Titterington et al. |
| 6,028,126 | A | 2/2000 | Wang et al. |
| 6,060,541 | A | 5/2000 | Anderson et al. |
| 6,069,218 | A | 5/2000 | Vogt-Birnbrich et al. |
| 6,103,780 | A | 8/2000 | Matzinger et al. |
| 6,136,382 | A | 10/2000 | Kamen et al. |
| 6,136,890 | A | 10/2000 | Carlson et al. |
| 6,179,417 | B1 | 1/2001 | Lowry et al. |
| 6,312,858 | B1 | 11/2001 | Yacobucci |
| 6,437,041 | B1 | 8/2002 | Bosch et al. |
| 6,531,228 | B1 | 3/2003 | Bartelink et al. |
| 6,670,002 | B1 | 12/2003 | Sekiguchi et al. |
| 6,682,779 | B1 | 1/2004 | Wefringhaus et al. |
| 6,780,231 | B2 | 8/2004 | Scholz et al. |
| 6,794,425 | B1 | 9/2004 | Ellis et al. |
| 6,852,763 | B2 | 2/2005 | Noda |
| 6,863,389 | B2 | 3/2005 | Merz et al. |
| 6,905,732 | B1 | 6/2005 | Dunshee et al. |
| 6,986,808 | B2 | 1/2006 | Fu et al. |
| 7,022,385 | B1 | 4/2006 | Nasser |
| 7,132,014 | B2 | 11/2006 | Mizutani et al. |
| 7,176,248 | B2 | 2/2007 | Valentini et al. |
| 7,374,605 | B2 | 5/2008 | Chung et al. |
| 7,513,945 | B2 | 4/2009 | Nakano et al. |
| 7,637,605 | B2 | 12/2009 | Mukata et al. |
| 7,649,030 | B2 | 1/2010 | Tu |
| 7,740,694 | B2 | 6/2010 | Sharmin et al. |
| 7,785,410 | B2 | 8/2010 | Renner et al. |
| 7,828,426 | B2 | 11/2010 | Brust et al. |
| 7,871,467 | B2 | 1/2011 | Sano et al. |
| 7,872,060 | B2 | 1/2011 | Schmid et al. |
| 7,942,960 | B2 | 5/2011 | Sano et al. |
| 7,988,777 | B2 | 8/2011 | Tanoue et al. |
| 8,025,918 | B2 | 9/2011 | Broguiere et al. |
| 8,092,003 | B2 | 1/2012 | Sloan |
| 8,142,559 | B2 | 3/2012 | Robertson et al. |
| 8,187,371 | B2 | 5/2012 | Brust et al. |
| 8,192,008 | B2 | 6/2012 | Brust et al. |
| 8,227,524 | B2 | 7/2012 | Rolly |
| 8,267,505 | B2 | 9/2012 | Jolly et al. |
| 8,313,572 | B2 | 11/2012 | Oyanagi et al. |
| 8,430,492 | B2 | 4/2013 | Falkner et al. |
| 8,465,580 | B2 | 6/2013 | Tanoue et al. |
| 8,476,332 | B2 | 7/2013 | Jeremic |
| 8,480,223 | B2 | 7/2013 | Shibata |
| 8,492,456 | B2 | 7/2013 | Chen et al. |
| 8,563,634 | B2 | 10/2013 | Deiner et al. |
| 8,573,762 | B1 | 11/2013 | Prasad |
| 8,574,356 | B2 | 11/2013 | Kagata et al. |
| 8,623,126 | B1 | 1/2014 | Brust et al. |
| 8,664,331 | B2 | 3/2014 | Richards |
| 8,716,390 | B2 | 5/2014 | Reisacher et al. |
| 8,759,418 | B2 | 6/2014 | Li et al. |
| 8,841,357 | B2 | 9/2014 | Nagahama et al. |
| 8,939,568 | B2 | 1/2015 | Stoeva et al. |
| 8,940,821 | B2 | 1/2015 | Brust et al. |
| 9,085,150 | B2 | 7/2015 | Aoyama |
| 9,090,734 | B2 | 7/2015 | Kraiter et al. |
| 9,187,665 | B2 | 11/2015 | Vasudevan et al. |
| 9,228,096 | B2 | 1/2016 | Overbeek et al. |
| 9,249,326 | B2 | 2/2016 | Robertson et al. |
| 9,309,438 | B2 | 4/2016 | Lindekens et al. |
| 9,375,031 | B2 | 6/2016 | Boccacci |
| 9,376,582 | B1 | 6/2016 | Dannhauser et al. |
| 9,434,201 | B2 | 9/2016 | Dannhauser et al. |
| 9,446,604 | B2 | 9/2016 | Sarkisian et al. |
| 9,493,013 | B2 | 11/2016 | Chen et al. |
| 9,790,380 | B2 | 10/2017 | Verheggen et al. |
| 9,868,869 | B2 | 1/2018 | Litman et al. |
| 10,604,667 | B2 | 3/2020 | Pilon et al. |
| 10,738,208 | B2 | 8/2020 | Ingle et al. |
| 2001/0037749 | A1 | 11/2001 | Ogawa et al. |
| 2003/0144375 | A1 | 7/2003 | Wu et al. |
| 2003/0184629 | A1* | 10/2003 | Valentini ................ C09D 11/30 347/100 |
| 2004/0085419 | A1 | 5/2004 | Yau et al. |
| 2005/0025880 | A1 | 2/2005 | Masuda |
| 2005/0182154 | A1 | 8/2005 | Berge et al. |
| 2006/0001725 | A1 | 1/2006 | Nagata et al. |
| 2006/0100308 | A1 | 5/2006 | Yau et al. |
| 2006/0109327 | A1 | 5/2006 | Diamond et al. |
| 2006/0257760 | A1 | 11/2006 | Mori et al. |
| 2007/0142572 | A1 | 6/2007 | Ogawa et al. |
| 2007/0289487 | A1 | 12/2007 | Ham et al. |
| 2008/0006175 | A1 | 1/2008 | King et al. |
| 2008/0081124 | A1 | 4/2008 | Sano et al. |
| 2008/0207805 | A1 | 8/2008 | Blease et al. |
| 2008/0207811 | A1 | 8/2008 | Brust et al. |
| 2008/0226880 | A1 | 9/2008 | Parra Pastor et al. |
| 2008/0227356 | A1 | 9/2008 | Poruthoor et al. |
| 2008/0254228 | A1 | 10/2008 | Kojima et al. |
| 2008/0282932 | A1* | 11/2008 | Kiyomoto ............ C09D 11/322 106/31.86 |
| 2008/0317957 | A1 | 12/2008 | Overbeek et al. |
| 2009/0169748 | A1 | 7/2009 | House et al. |
| 2009/0169749 | A1 | 7/2009 | Brust et al. |
| 2009/0182098 | A1 | 7/2009 | Sano et al. |
| 2009/0213151 | A1 | 8/2009 | Dannhauser et al. |
| 2009/0246484 | A1 | 10/2009 | Kumagai et al. |
| 2009/0306285 | A1 | 12/2009 | Li et al. |
| 2010/0239761 | A1 | 9/2010 | Haenen et al. |
| 2010/0304057 | A1 | 12/2010 | Zeng et al. |
| 2011/0032303 | A1 | 2/2011 | Li |
| 2011/0058006 | A1 | 3/2011 | Kobayashi |
| 2011/0239903 | A1 | 10/2011 | Sujeeth et al. |
| 2012/0001980 | A1 | 1/2012 | Ichinose et al. |
| 2012/0004348 | A1 | 1/2012 | Reisacher et al. |
| 2012/0021193 | A1 | 1/2012 | Lecolley et al. |
| 2012/0108717 | A1 | 5/2012 | Park et al. |
| 2012/0135209 | A1 | 5/2012 | Becker et al. |
| 2012/0223999 | A1 | 9/2012 | Kraiter et al. |
| 2012/0306976 | A1 | 12/2012 | Kitagawa et al. |
| 2012/0314009 | A1 | 12/2012 | Kashara |
| 2012/0321863 | A1 | 12/2012 | O'Donnell et al. |
| 2012/0329921 | A1 | 12/2012 | Vasudevan et al. |
| 2013/0021406 | A1 | 1/2013 | Stoeva et al. |
| 2013/0162722 | A1 | 6/2013 | Brust et al. |
| 2013/0165618 | A1 | 6/2013 | Brust et al. |
| 2013/0201250 | A1 | 8/2013 | Berge |
| 2013/0221288 | A1 | 8/2013 | Liu et al. |
| 2013/0224445 | A1 | 8/2013 | Donohoe et al. |
| 2013/0237661 | A1 | 9/2013 | Brust et al. |
| 2013/0265376 | A1 | 10/2013 | Gil-Torrente et al. |
| 2013/0286087 | A1 | 10/2013 | Berge |
| 2013/0307914 | A1 | 11/2013 | Chen et al. |
| 2014/0017461 | A1 | 1/2014 | Matsuyama |
| 2014/0022321 | A1 | 1/2014 | Komatsu |
| 2014/0037913 | A1 | 2/2014 | Nagahama et al. |
| 2014/0118449 | A1 | 5/2014 | Sarkisian et al. |
| 2014/0134337 | A1 | 5/2014 | Overbeerk et al. |
| 2014/0161985 | A1 | 6/2014 | Gane et al. |
| 2014/0240399 | A1 | 8/2014 | Saito et al. |
| 2014/0364548 | A1 | 12/2014 | Everhardus et al. |
| 2015/0038641 | A1 | 2/2015 | Gobelt et al. |

(56)     References Cited

U.S. PATENT DOCUMENTS

| | | | |
|---|---|---|---|
| 2015/0118452 A1 | 4/2015 | Ohashi et al. | |
| 2015/0119510 A1 | 4/2015 | Eliyahu et al. | |
| 2015/0183192 A1 | 7/2015 | Bhattacharya et al. | |
| 2015/0184010 A1* | 7/2015 | Okada | C09C 1/3653 |
| | | | 428/207 |
| 2015/0191602 A1 | 7/2015 | Denda | |
| 2015/0210859 A1 | 7/2015 | Denda et al. | |
| 2015/0225285 A1 | 8/2015 | Domey et al. | |
| 2015/0315393 A1 | 11/2015 | Xu et al. | |
| 2015/0344708 A1 | 12/2015 | Niu et al. | |
| 2016/0166446 A1 | 6/2016 | Warner et al. | |
| 2017/0009092 A1* | 1/2017 | Gotou | C09D 11/38 |
| 2017/0096570 A1 | 4/2017 | Litman et al. | |
| 2017/0137648 A1 | 5/2017 | Seki et al. | |
| 2017/0321084 A1 | 11/2017 | Huang et al. | |
| 2018/0001669 A1* | 1/2018 | Furukawa | C09D 11/40 |
| 2018/0016743 A1 | 1/2018 | Kido et al. | |
| 2020/0047532 A1 | 2/2020 | Deighton et al. | |
| 2020/0377762 A1 | 12/2020 | Deighton et al. | |
| 2023/0030249 A1* | 2/2023 | Sugihara | C09D 11/40 |

OTHER PUBLICATIONS

Kyocera Flexible Package Printer, Jul. 9, 2019.
Takelac WS-4000 Polyurethane Resin Technical Datasheet, Apr. 25, 2018.
Takelac WS-5000 Polyurethane Resin Technical Datasheet, Apr. 25, 2018.
Takelac WS-6021 Polyurethane Resin Technical Datasheet, Apr. 25, 2018.
Wang Duoren, New Adhesive and Coating Materials, Beijing China Building Materials Press, May 2000.

* cited by examiner

Figure 5:
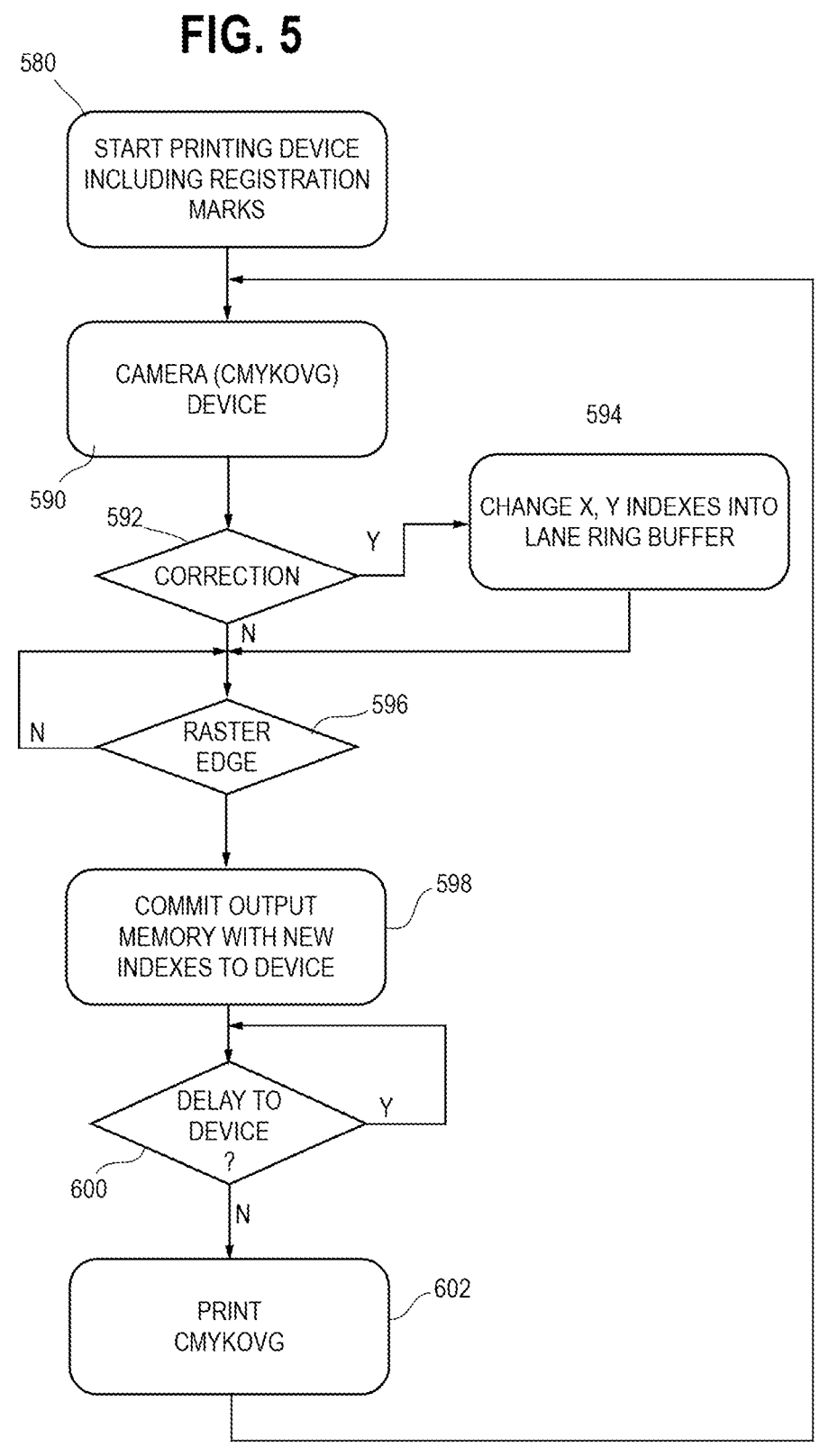

START PRINTING DEVICE
INCLUDING REGISTRATION
MARKS

CAMERA (CMYKOVG)
DEVICE

590

594

592

CORRECTION

Y → CHANGE X, Y INDEXES INTO
LANE RING BUFFER

N

596

N ← RASTER
EDGE

598

COMMIT OUTPUT
MEMORY WITH NEW
INDEXES TO DEVICE

DELAY TO
DEVICE
?

Y

600

N

602

PRINT
CMYKOVG

PRINTING COMPOSITIONS AND METHODS THEREFOR

CROSS-REFERENCE TO RELATED APPLICATIONS

This application claims priority to U.S. patent application Ser. No. 62/988,618, filed Mar. 12, 2020 and entitled "Printing Compositions and Methods Therefor," the entirety of which is incorporated herein by reference.

BACKGROUND

The present subject matter relates to printing compositions and methods, and more particularly, printing compositions and methods for use on a flexible/shrinkable and/or impermeable substrate.

Flexographic printing is a well-known technique in the printing industry utilizing a flexible relief plate. It is used for printing on many substrates, including plastic, metallic films, and other water impermeable material.

Ink jet printing is also a well-known technique wherein a digital image is recreated upon a substrate by depositing droplets of ink onto the substrate.

Additionally, high speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary: 1.) to control material shrinkage during imaging so that the resulting imaged film may be subsequently used in a shrink-wrap process, and 2.) to avoid system control problems by minimizing dynamic interactions between system components due to the elastic deformability of the substrate. Such considerations also impact the process of registering printed content so that the content is accurately reproduced.

Specifically, a flexible web may be printed simplex (i.e., on one side) or duplex (that is, two sided). In either event, separately printed images, even if printed by a single printing unit (e.g., a multi-color imager unit), must be accurately registered with one another to minimize misregistration errors, such as color shifts, moire, undesired dot gain effects, or the like.

Furthermore, the use of water-based inks and coatings for commercial print applications, including but not limited to flexography and ink jet printing, has been on the increase due in part to environmental and health concerns about volatile organic compounds ("VOC's") in solvent-based compositions that emit during the drying process.

Health concerns are highlighted when printing for the food industry. For instance, Switzerland has put legislation in place regulating food-packaging printing inks. A list of components that may be used in printing inks have been compiled in an effort to remove some substances deemed carcinogenic, mutagenic, or toxic to reproduction. While only required in Switzerland, the Swiss Ordinance RS 817.023.21 with respect to printing inks and coatings alike is generally accepted as useful when creating ink(s) and/or ink receptive compound(s) for indirect food contact purposes, such as for food packaging, worldwide.

As for general printing on a substrate or web that is porous or permeable, water within the ink is partially absorbed by the surface of the web during a drying process. However, there exists a problem when water-based inks are deposited on a web that is impermeable, such as a plastic web, metal web, and similar surfaces. Since inks dry primarily via evaporation during a drying and/or curing period, the lack of ability of the water-based ink to penetrate or absorb into the web itself leads to individual ink droplets spreading across the surface of the web. If a compilation of individual ink droplets spread and touch one another, the desired image quality may be adversely affected due to coalescing of the adjacent ink droplets. This is a problem that typically occurs with high-speed printing.

Additionally, another problem during high speed printing known as "ink retransfer" or "pickoff" may occur, where the ink for the printed image has not sufficiently dried before contacting another part of the web system, such as an idler roller, and the ink is transferred unintentionally from the printed area to the roller.

Furthermore, if during the printing process the temperature of the substrate exceeds the substrate's threshold for dimensional integrity, the substrate may shrink and/or deform leading to unusable product.

The discussion above is merely provided for general background information and is not intended to be used as an aid in determining the scope of the claimed subject matter.

BRIEF DESCRIPTION

According to one aspect, a printing composition of the present application comprises from about 10.00% to about 14.00% by weight of a pigment, from about 3.00% to about 7.00% by weight of a polymer, from about 15.00% to about 19.00% by weight of a co-solvent, from about 0.20% to about 0.40% by weight of a surfactant, and water.

According to another aspect, a printing composition comprises from about 4.00% to about 5.00% by weight of a pigment, from about 7.00% to about 11.00% by weight of a polymer, from about 13.00% to about 17.00% by weight of a co-solvent, from about 0.25% to about 2.00% by weight of a surfactant, and water.

According to yet another aspect, a method of printing comprises providing a substrate, applying a printing composition to a surface of the substrate, wherein the printing composition comprises from about 10.00% to about 14.00% by weight of a pigment, from about 3.00% to about 7.00% by weight a of polymer, from about 15.00% to about 19.00% by weight of a co-solvent, from about 0.20% to about 0.40% by weight of a surfactant, and water, and drying the substrate, wherein the temperature of the substrate does not exceed a threshold for dimensional integrity of the substrate.

According to another aspect, a method of printing comprises providing a coated substrate, applying a printing composition to a surface of the coated substrate, wherein the printing composition comprises from about 4.00% to about 5.00% by weight of a pigment, from about 7.00% to about 11.00% by weight a of polymer, from about 13.00% to about 17.00% by weight of a co-solvent, from about 0.25% to about 2.00% by weight of a surfactant, and water, and drying the coated substrate, wherein the temperature of the coated substrate does not exceed a threshold for dimensional integrity of the coated substrate.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5 is a flowchart of programming executed by the print management system of FIG. 4;

FIG. 10 is fragmentary plan view of a portion of the web with imager units and sensors;

FIG. 11 is a fragmentary plan view of the web with content portions printed in five lanes of the web.

DETAILED DESCRIPTION

Figure 1:
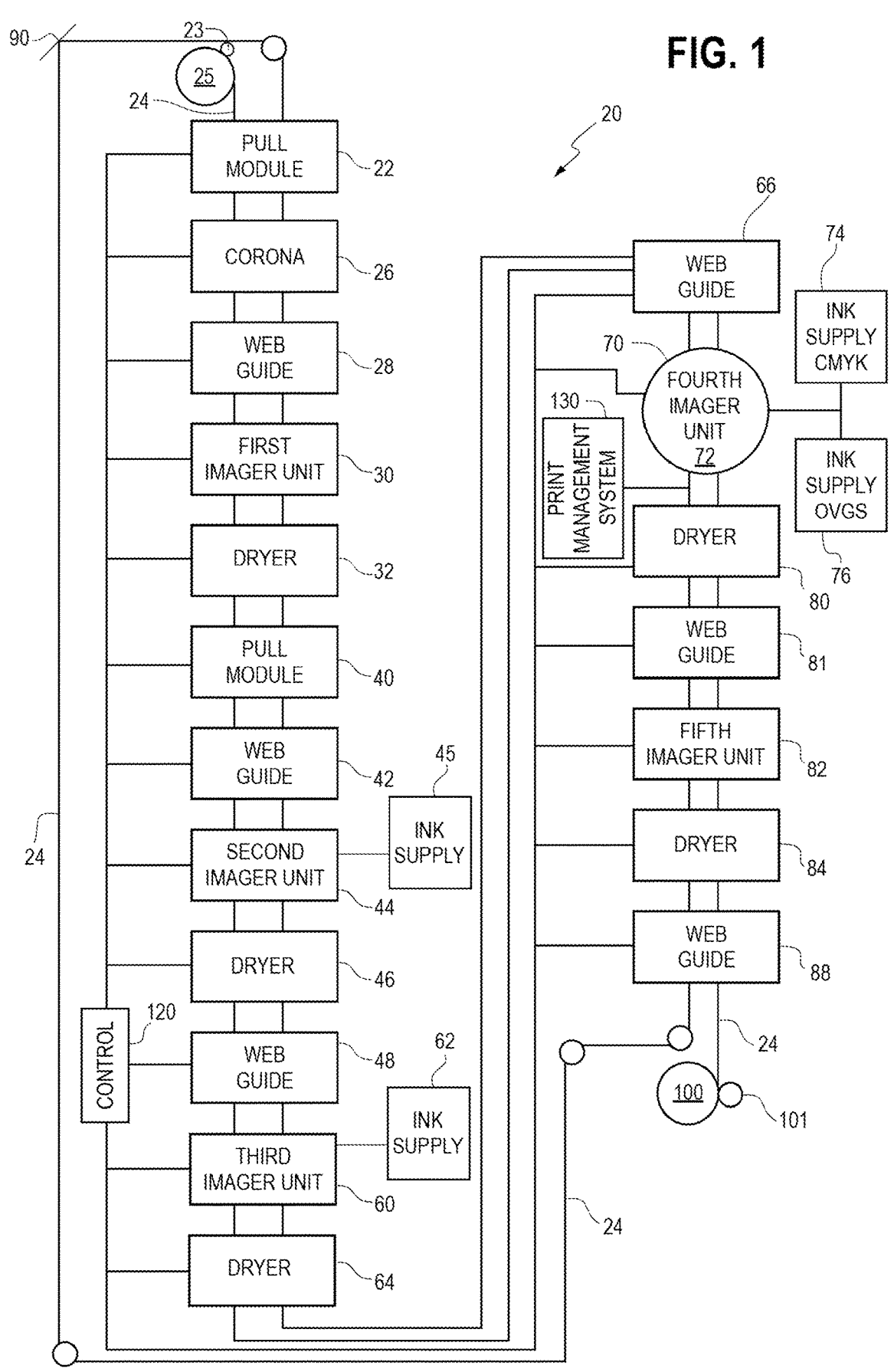
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52 inch width, and may be capable of duplex printing up to a 26 inch wide substrate. Alternatively, a 52 inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inch in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letterpress printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high quality color gamut at high speed is further process controlled by sensor(s) that may comprise one or more calibration cameras to fine tune the system continually over the length of large runs.

As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides 24a, 24b (see FIG. 2) joined at side folds 24c, 24d, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24 or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dpi, 5-12 pL size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97 "Standard Test Method for Transparency of Plastic Sheeting", published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit is not required, and the unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the units 30, 44 may be omitted.

In some embodiments each of the first, second, and third imager units 30, 44, 60 comprises a 600 dpi (dots per inch) inkjet printer that applies relatively large drops (i.e., at least 5-12 picoliters (pL)) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The pre-coating material, white, and metallic inks have relatively heavy pigment loading and/or large particle sizes that are best applied by the relatively low resolution/large drop size heads of the imagers 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run. A further control system comprising a print management control system 130 controls the various imager units also in a closed-loop fashion to control image reproduction as well as color correction, registration, correct for missing pixels, etc.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

In addition to the foregoing, one or more additional control systems may be provided, for example, to track and control the web 24 as the web 24 is conveyed through the system 20. The various control systems may be implemented together or separately by one or more suitable programmable devices, input sensors, and output control devices, as appropriate or desirable.

Figures 2, 3:
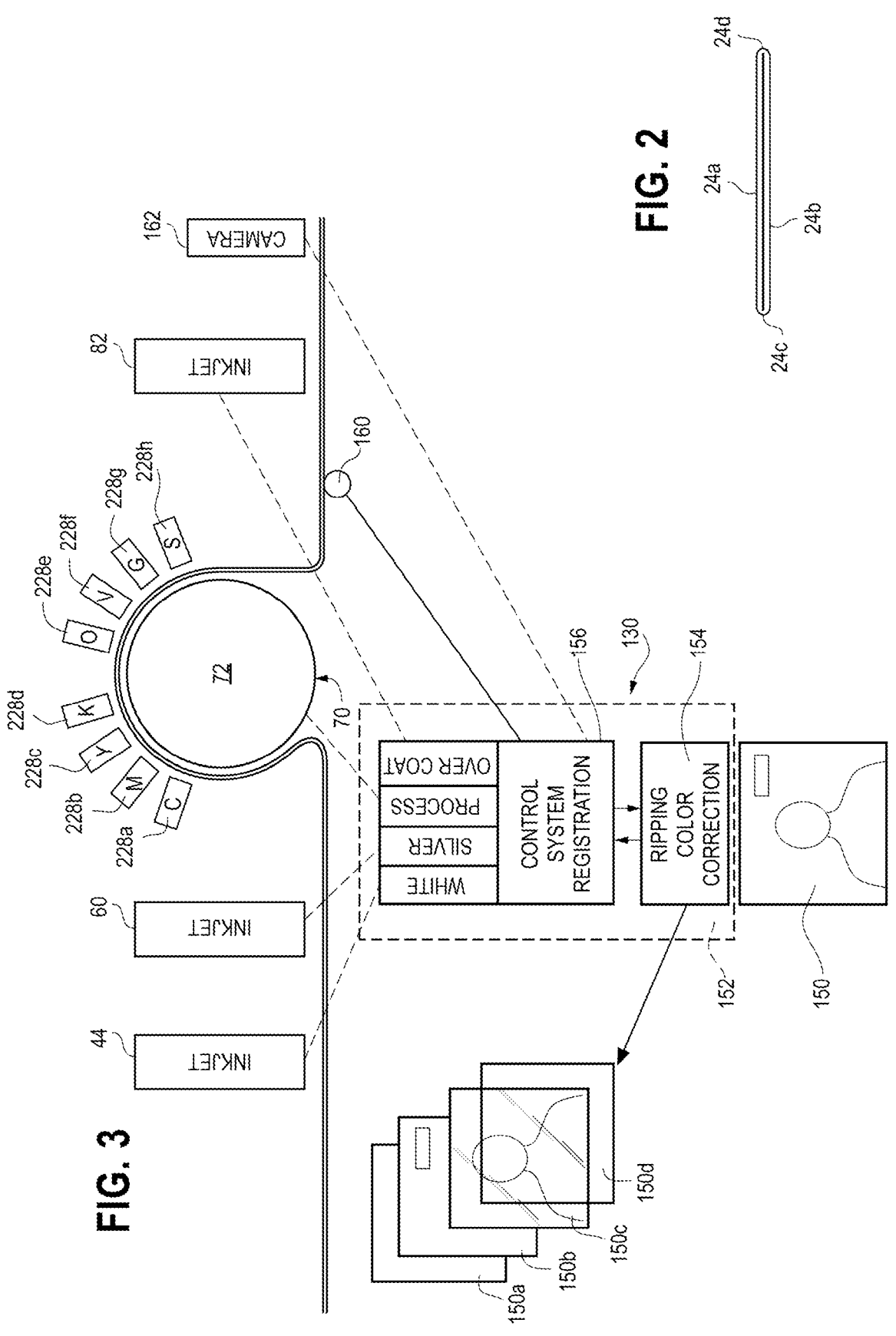
FIG. 2 is an end elevational view of a polymeric film to be imaged by the system of FIG. 1.
FIG. 3 is a simplified functional block diagram of the print management system of FIG. 1.

Referring next to FIG. 3, an exemplary embodiment of the print management control system 130 is illustrated in generalized form, it being assumed that the first imager unit 30 applies pre-coating material over a selected portion of or over the entire web 24 so that control of such unit 30 is straightforward and therefore not illustrated. The exemplary print management control system 130 takes in pages 150 in a print-ready format, such as PDF or another print-ready or non-print-ready format, and divides each page into data representing layers that are to be imaged by the imager units 44, 60, 70, and 82. More particularly, using the illustrated page 150 as an example, a processing unit 152 divides the data defining the page 150 into layer data representing four layers 150*a*, 150*b*, 150*c*, and 150*d* to be printed in white, silver, process colors (with an optional spot color), and overcoat, respectively, color corrects the layer data as needed taking into account the particular inks and web material, and converts the color corrected layer data into four layer bitmaps using a raster image processing (RIP) technique (block 154). The processing unit 152 then determines registration parameters that are used in conjunction with the layer bitmaps to control the individual imager units 44, 60, 70, and 82 (block 156) such that the layer images are accurately printed atop one another on the web 24.

The processing unit 152, which may comprise a suitably programmed computer or server or other programmable device, is responsive to feedback signals developed by sensors including a web tracking sensor 160 and, optionally, a camera 162 that sense web position and the printed image so that the processing unit 152 and/or other controls can operate in a closed-loop manner during start up, shutdown and steady state operation.

Figure 4:
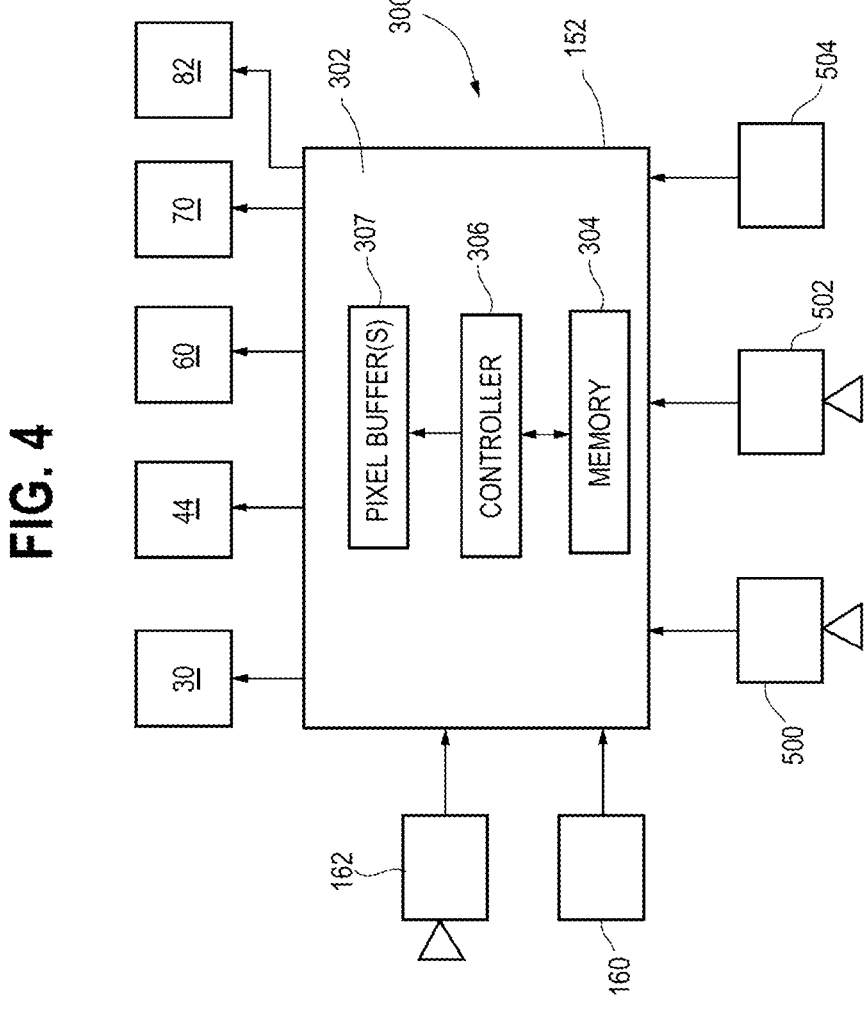
FIG. 4 is a block diagram of a computer system for implementing the print management system of FIG. 1.
Figure 12:
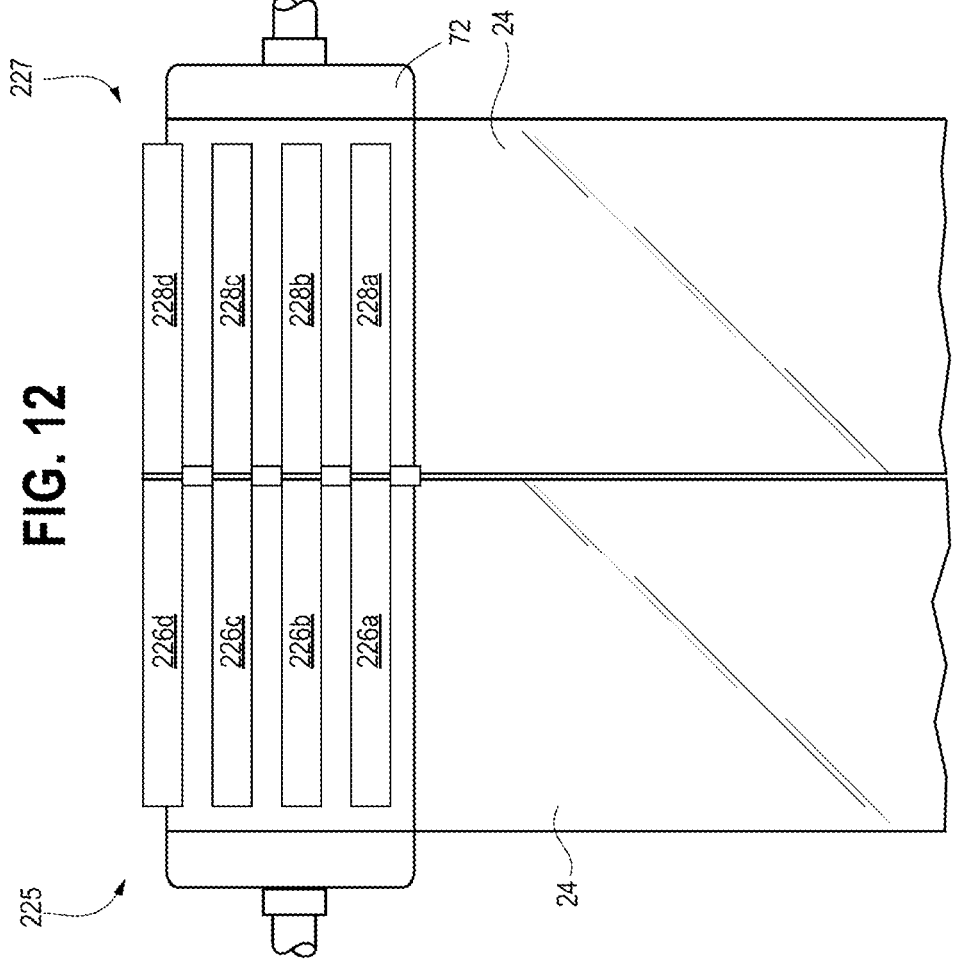
FIG. 12 is a combined fragmentary side elevational and block view of a further portion of the imager unit 70 FIG. 1.

As seen in FIGS. 4 and 12, the print management control system 130 or unit controls the various imager units 30, 44, 60, 70, and 82. For example, the imager unit 70 includes first and second imager portions 225, 227 wherein each imager portion 225, 227 comprises one or two printheads for each of the colors CMYK and OVG and the spot color S for a total of sixteen printheads (in the case that there is a single printhead per imager portion). Eight of the printheads 226*a*-226*d* and 228*a*-228*d* are shown in FIG. 12. The heads 226*a*, 228*a* are independently operable and disposed in side-by-side relationship to apply cyan up to the full width of the web 24, the heads 226*b*, 228*b* are disposed in side-by-side relationship and are independently operable to apply magenta up to the full width of the web 24, and so on for the remaining printheads (as seen in FIG. 3 the printheads 226, 228 are disposed about the periphery of the drum 72 and the printheads 226, 228 for the colors OVGS are disposed behind the drum 72 of FIG. 12 and are thus not visible in such FIG.). The printhead 226 for each color is laterally directly adjacent the printhead 228 for the same color (i.e., the innermost ejection orifices or ports of the printheads 226, 228 are spaced substantially equal to the spacing between the remaining adjacent orifices or ports of the printheads 226, 228) so that a full-width web may be imaged without creating a lateral gap between the portions imaged by the printheads 226, 228 on the web 24.

Each of the remaining imager units 30, 44, 60, and 82 similarly includes laterally offset and independently operable first and second imager portions comprising sets of printheads, as in the imager unit 70. The printheads of each first imager portion are adjacent the printheads of the second imager portion in each imager unit 30, 44, 60, and 82 just as in the imager unit 70. Preferably, all of the printheads of the imager units 30, 44, 60, 70, and 82 are stationary along the process and lateral dimensions and print up to the full width of the moving web without creating a lateral gap between the web portions imaged by the first and second imager portions as described above. In the illustrated embodiment, the first portions of the imager units 30, 44, 60, 70, and 82 print on the first side 24*a* of the web 24 and the second portions of the imager units 30, 44, 60, 70, and 82 print on the second side 24*b* of the web 24.

FIG. 4 illustrates a computer system 300 especially adapted to implement the print management control system 130 in a digital fashion, it being understood that any or all of the control systems disclosed herein, such as one or more of the control system 120 and/or the dryer control system(s), may be implemented by like computer systems or by the computer system 300. Thus, for example, the system 300 may comprise the processing unit 152 and, if desired, may implement the control system 120. The computer system 300 comprises a personal computer, server, or other programmable device 302 having a memory 304 that, among other things, stores programming as seen in FIG. 5 that is executed by a processing module or controller 306 to implement the print management control system 130. The device 302 receives signals from various sensors, which may comprise cameras and/or other devices. Specifically, in the illustrated embodiment the device 302 is responsive to cameras 500, 502 located upstream from the imager unit 70 and a further sensor 504, which may comprise a camera or a conventional sense mark device, which is adapted to sense a registration mark through the back side 24*b* of the web 24. The device 302 may also be responsive to a web position signal developed by the web tracking sensor 160 and, optionally, the camera 162. The camera 162, when used, images the entire width of the web 24 (54 inches in the illustrated embodiment) and allows the print management control system 130 (or any of the other control systems of the system 20) to stitch together images printed by printheads, undertake color-to-color registration and color calibration, detect missing pixel(s), and undertake printhead normalization across the web.

The device 302 is also responsive to other cameras (not shown) each located upstream of other imager units 30, 44, 60, and 82 and includes one or more pixel buffers 307 that store data to control the first though fifth imager units in the manner described below in connection with the fourth imager unit 70.

Figure 8:
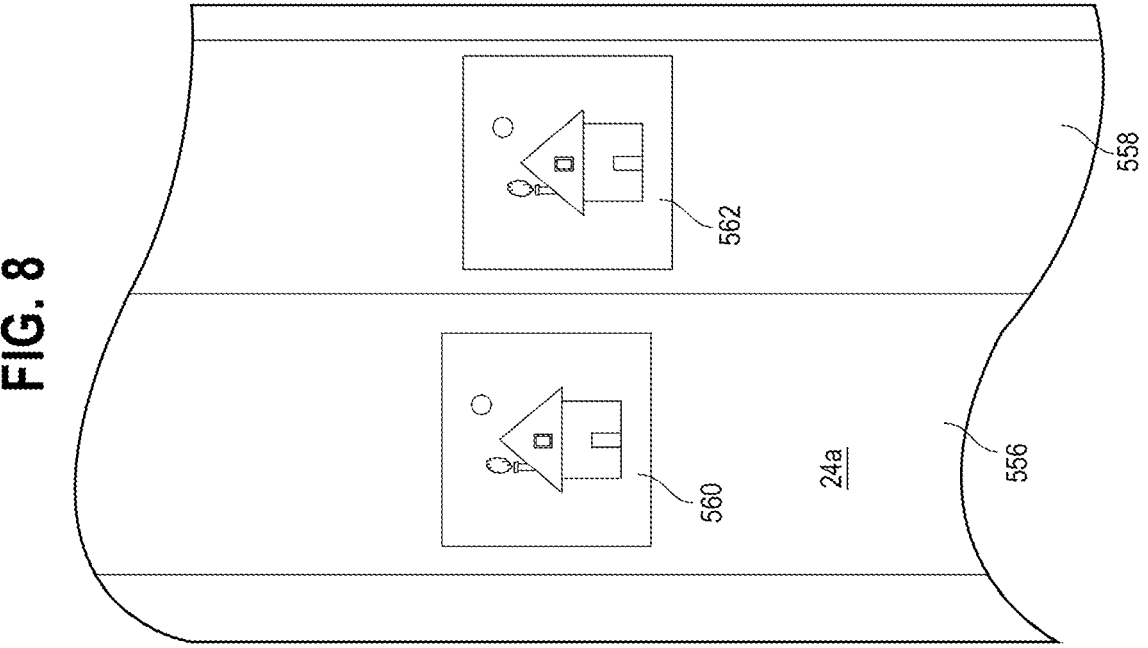
FIG. 8 is a fragmentary plan view of the web with content portions printed in two lanes of the web.

As is conventional, a repeating series of content portions separated by blank areas are printed along the length of the web 24. Each content portion may comprise an image, text, or both. Thus, for example, in the illustrated embodiment of FIG. 8, the web 24 is to be printed on the first side 24*a* in two laterally-spaced lanes 556, 558 with repeating sets of images 560, 562 wherein the images 560, 562 are offset along the process direction perpendicular to the lateral direction so that the content portions are separated by blank areas (only one set of images 560, 562 is illustrated in FIG. 8, it being understood that other equally-spaced (or non-equally-spaced) sets are printed on and along the web 24 in the process direction). It should be noted that the web 24 may be printed simplex or duplex in a different number of lane(s) and that printed content may or may not be offset relative to one another along the process direction. Also in the illustrated embodiment, the images 560, 562 are identical, or substantially so, although the system 20 may print image(s) and/or text comprising printed content of any kind and the printed content in the lanes may be substantially or completely different.

Figure 9:
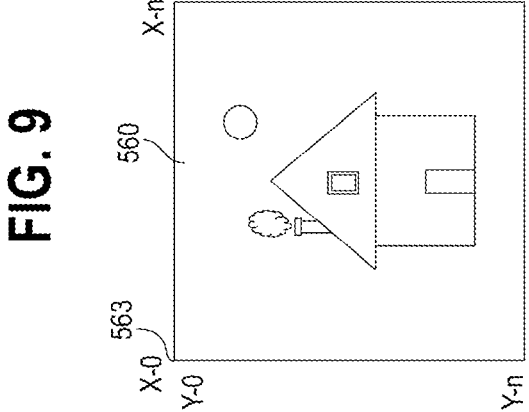
FIG. 9 is an enlarged plan view of one of the printed content portions of FIG. 8.

As seen in FIG. 9 each printed content portion, such as the image 560, has an X-dimension along the lateral direction and a Y-dimension along the process direction. In the illustrated embodiment each content portion has an X-dimension equal to the Y-dimension wherein both are n units (such as inches) in width and length, respectively. Also, an origin point 563 is located at upper left-hand corner of the image 560.

Figures 6, 7:
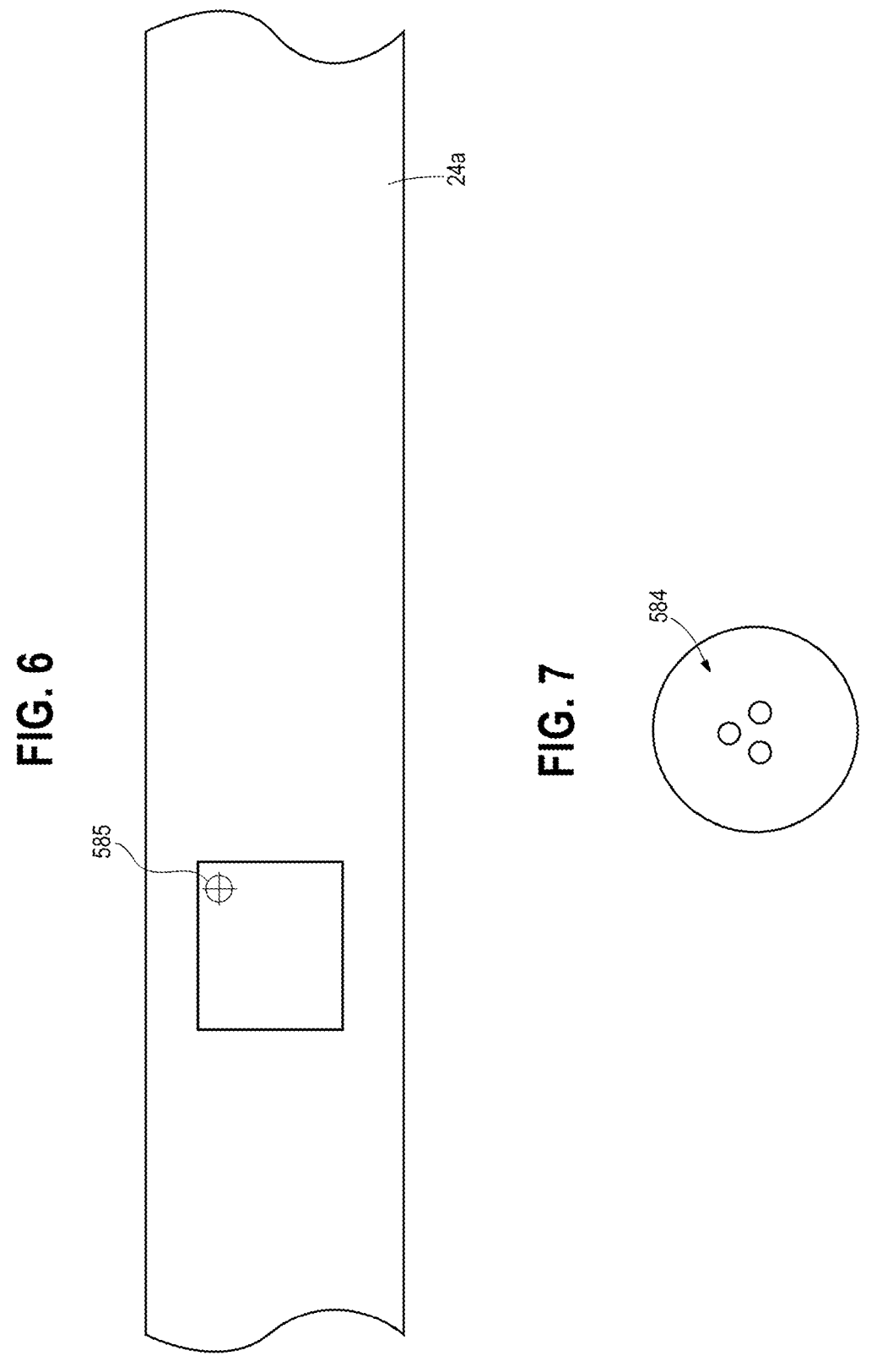
FIG. 6 is simplified plan view of a portion of the web of FIG. 1 illustrating application of a registration mark thereon.
FIG. 7 is an enlarged fragmentary view of the registration mark of FIG. 6.

The programming of FIG. 5 is executed independently for each lane 556, 558. The programming begins at a block 580 that instructs a first printing device comprising a portion of the system 20, such as the second imager unit 44, to print registration marks or fiducials 584 (one of which is shown in FIG. 7 and another is shown in FIG. 8) on the first side 24a of the web 24, wherein each registration mark is printed together with one of the repeating printed content portions laid down by the unit 44 and is disposed at a controlled position 585 (one of which is seen in FIG. 6) with respect to and adjacent such printed content portion. Specifically, as seen in the embodiment of FIGS. 7 and 8, each registration mark 584 may be of any suitable design, such as, for example, three white dots arranged in a triangular configuration wherein a center of the three dots is disposed upstream and to the left at precise distances along the process direction and the lateral direction, respectively, from the origin point 563 of what will become, when fully printed, an associated content portion, such as the image 560a as shown in FIG. 8. The registration marks 584 are, therefore, preferably printed outside of the web areas that are to be imaged.

Referring again to FIG. 5, the programming continues at a block 590 that senses the output of the camera 500 of FIG. 4 downstream of the imager unit 60 and upstream of the imager unit 70. In the illustrated embodiment, the camera 500 comprises a CCD device or other suitable optical device that develops an optical reproduction of either the entire web 24, an entire web portion 24a and/or 24b, or only a portion of each web portion 24a or 24b. Thus, in the illustrated embodiment, for example, the system 300 includes separate cameras 500 and 502, although these cameras may be replaced by a single camera that simultaneously captures images of the laterally offset web sides 24a and 24b. In any event at least one camera is provided to sense each registration mark on each side of the web 24. When the camera 500 detects a center point of a registration mark, a block 592 determines any physical offset of the center point in the X-dimension and the Y-dimension from an expected position. The pixel buffer(s) 307, which may include one or more output lane ring buffers, are prestored with the raster-image processed (RIP) data for several content portions to be next imaged and intervening blank portions in the associated lane. In this regard it may be noted that the output lane ring buffer(s) continuously output data on a sequential raster-by-raster basis for the content portions and the intervening blank portions. If the block 592 determines that position corrections are necessary, a block 594 sequentially offsets pointers ("X, Y indexes") associated with the RIP data in a first raster for the next content portion to be imaged by the imager unit 70. A block 596 monitors the offset process, and when the offset process for the last of the RIP data of the first raster has been completed, the pointers for the first raster are used by a block 598 to deliver the RIP data for the first raster at the required offset, which is determined by counting pulses developed by the position encoder 160, to an output buffer of the pixel buffers 307. The blocks 594, 596, and 598 continually operate to offset the pointers for subsequent rasters of RIP data and deliver such data to the output buffer. Next, a block 600 delays the delivery of the RIP data to the imager unit 70 by a time that takes into account the distance of the registration mark from the leading edge of the content portion to be next printed by the imager unit 70, and a block

602 transmits the RIP data to the unit 70 at the proper time so that the content portion is printed accurately on the web 24.

Control from the block 602 returns to the block 590 to await the sensing of the next registration mark.

Figure 11:
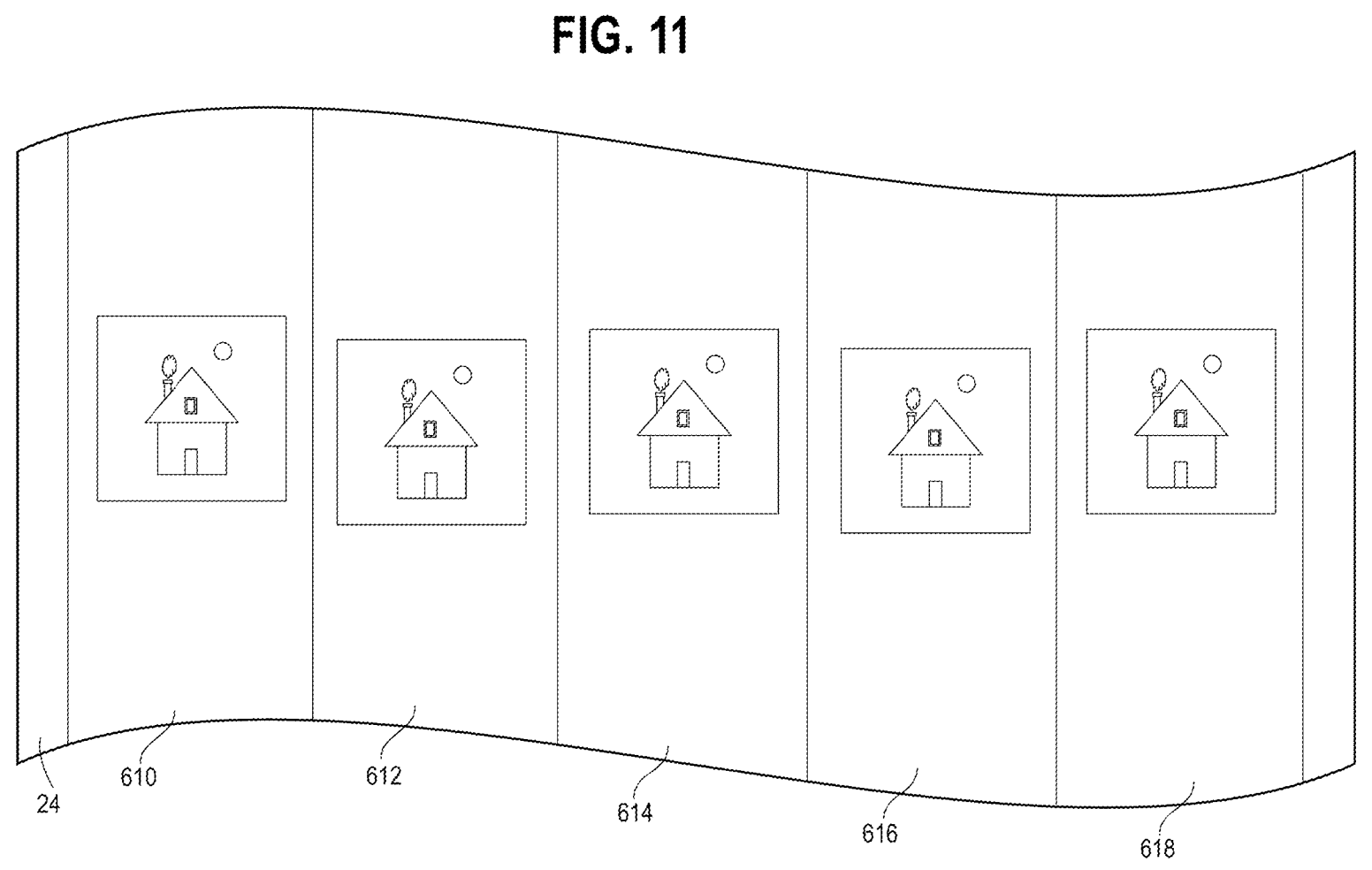

As noted previously, the programming to reproduce content portions in the lane 558 is identical to that shown and described above and such programming is executed independently from the programming of FIG. 5. In fact, as shown in FIG. 11, more lanes, such as lanes 610, 612, 614, 616, and 618 may each be printed by an instance of the programming of FIG. 5 wherein the programming instances operate independently.

Figure 10:
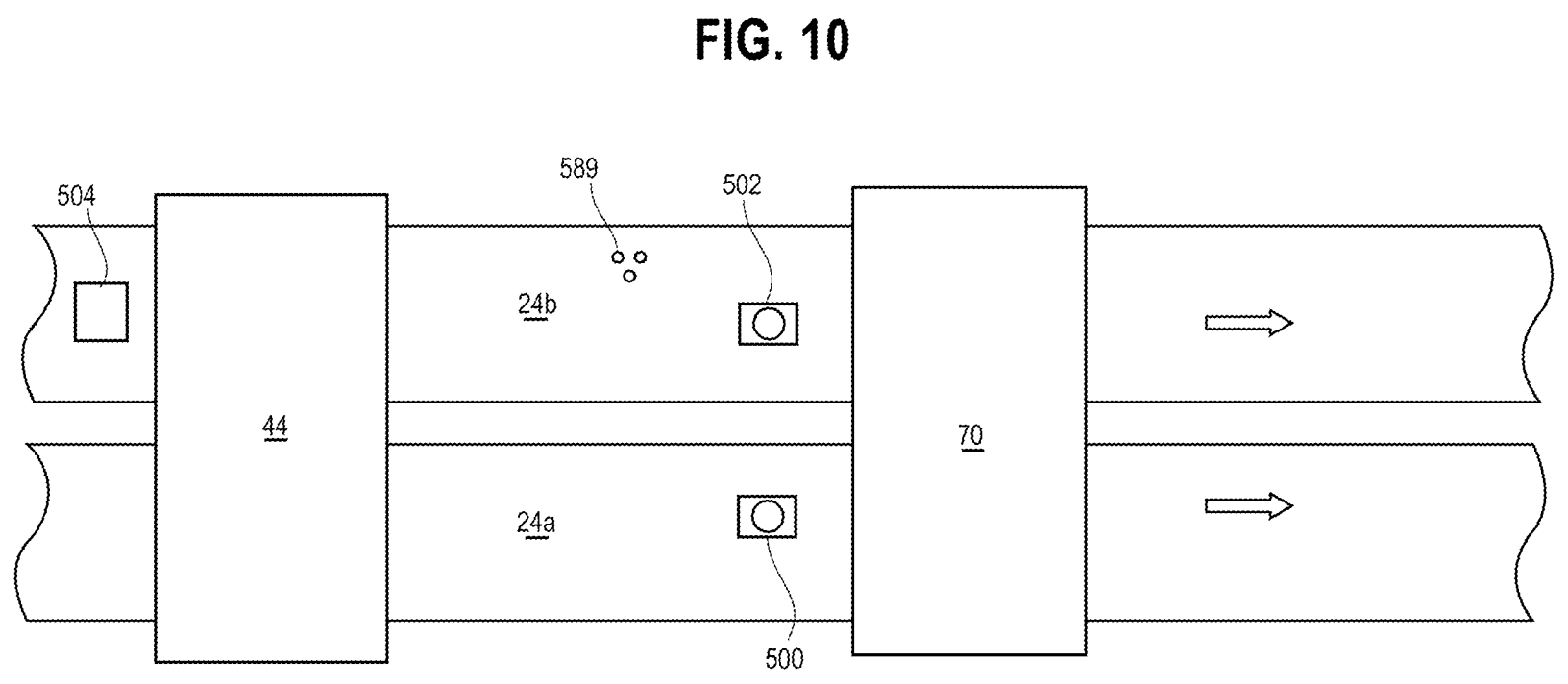

FIG. 10 illustrates an embodiment in which registration is undertaken for both sides of the web 24a, 24b. Once the first side 24a is imaged as noted above, the web in turned upside down as noted previously and traverses a second, laterally offset path during the second pass. In one embodiment the sensor 504 detects the registration mark 584 through the transparent web 24. Alternatively, the sensor 504 may be disposed below the web 24 and directly detect the registration mark 584. In either case, an instance of the programming of FIG. 5 operates the imager unit 44 to print white content portion in a registered position on the web side 24b together with another registration mark 589 similar or identical to the registration mark 584 both in terms of the configuration and placement relative to the content portion printed by the imager unit 44 this time on the second side of the web 24. The camera 502 thereafter detects the registration mark 589 to operate the imager unit 70 in register with the white printed content applied by the imager unit 44.

If desired each lateral portion of each of the remaining imager units 30, 60, and 82 may be operated by independent instances of the programming of FIG. 5 so that overall imager unit to imager unit registration is achieved, whether simplex printing or duplex printing.

It should be apparent to those who have skill in the art that any combination of hardware and/or software may be used to implement any or all of the system or components thereof described herein. It will be understood and appreciated that one or more of the processes, sub-processes, and process steps described in connection with the FIGS. may be performed by hardware, software, or a combination of hardware and software on one or more electronic or digitally controlled devices. The software may reside in a software memory (not shown) in a suitable electronic processing component or system such as, for example, one or more of the functional systems, controllers, devices, components, modules, or sub-modules schematically depicted in the FIGS. The software memory, for example the memory 304, may include an ordered listing of executable instructions for implementing logical functions (that is, "logic" that may be implemented in digital form such as digital circuitry or source code, or in analog form such as analog source such as an analog electrical, sound, or video signal). The instructions may be executed within the processing module or controller 306, which includes, for example, one or more microprocessors, general purpose processors, combinations of processors, digital signal processors (DSPs), field programmable gate arrays (FPGAs), or application-specific integrated circuits (ASICs). Further, the block diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

As should be evident from the foregoing, a printing composition such as an ink formulation may be applied directly to the surface of the web 24 or may be applied atop a coated surface, such as a primer and/or metallic ink, printed on the web 24 so as to simultaneously enable the adherence of a printed image to the web 24, and provide a chemical interaction with the printed compositions optimizing color fidelity and overall image quality. An optional printing composition such as an overprint varnish may be applied to modify the surface finish and appearance of the final imaged web 24.

Printing Composition 1

The printing composition may be a water-based white ink applied by ink jet to the web 24 by the first imager unit 30. The printing composition comprises a pigment or pigment dispersion, a polymer or polymer dispersion, a co-solvent, a surfactant, and water. In an exemplary embodiment, a carrier of the pigment dispersion and/or the polymer dispersion comprises water, preferably deionized water. In an exemplary embodiment, the co-solvent is water miscible and is a solvent or a carrier. In an exemplary embodiment, the printing composition includes from about 10.00% to about 14.00% by weight of a pigment or an equal weight in a pigment dispersion, preferably from about 10.50% to about 13.50% by weight, and most preferably from about 11.00% to about 13.00% by weight of a pigment or an equal weight in a pigment dispersion of the total printing composition percentage. The printing composition further includes from about 3.00% to about 7.00% by weight of a polymer or an equal weight in a polymer dispersion, preferably from about 3.50% to about 6.50% by weight, and most preferably from about 4.00% to about 6.00% by weight of a polymer or an equal weight in a polymer dispersion of the total printing composition percentage. The printing composition also includes from about 15.00% to about 19.00% by weight of a co-solvent, preferably from about 15.50% to about 18.50% by weight, and most preferably from about 16.00% to about 18.00% by weight of a co-solvent of the total printing composition percentage. The printing composition includes from about 0.20% to about 0.40% by weight of a surfactant, preferably from about 0.25% to about 0.35% by weight, and most preferably about 0.30% by weight of a surfactant of the total printing composition percentage. The printing composition also includes water, such as deionized water, in addition to any water apart of any dispersion, in an amount by weight to sum to 100.00%.

In an exemplary embodiment, the pigment or pigment dispersion comprises a titanium dioxide pigment, preferably Jetsperse® AQ White (AQD-PWHT), available from Sun Chemical of Parsippany, New Jersey.

In alternative embodiments, the pigment or pigment dispersion may be any other anionic pigment or pigment dispersion, such as a food packaging compliant anionic pigment or pigment dispersion.

In an exemplary embodiment, the polymer or polymer dispersion is anionic and comprises a waterborne polyurethane dispersion ("PUD"), preferably Takelac™ WPB-341, available from Mitsui Chemicals of Tokyo, Japan.

In alternative embodiments, the polymer or polymer dispersion may be any other nonionic or anionic polymer or polymer dispersion, such as a food packaging compliant nonionic or anionic polymer or polymer dispersion.

In an exemplary embodiment, the co-solvent comprises an alcohol-based co-solvent, preferably 3-methoxy-3-methyl-1-butanol, available from Kuraray of Okayama, Japan.

In alternative embodiments, the co-solvent may be any other co-solvent, such as a food packaging compliant co-solvent.

In an exemplary embodiment, the surfactant comprises a web wetting agent that is solvent-free. The surfactant may be a polyether modified polysiloxane compound, preferably BYK® 345, available from BYK-Chemie GmbH of Wesel, Germany.

In alternative embodiments, the surfactant may instead be another BYK® surfactants, such as BYK® 347, BYK® 348, BYK® 349 or may be another surfactant such as Dynol™ 980, available from Evonik of Essen, Germany, or instead be any other surfactant, such as a food packaging compliant surfactant.

Printing Composition 2

The printing composition may be a water-based non-white ink applied by ink jet to the web 24 by the third imager unit 60. In this exemplary printing composition includes from about 3.00% to about 6.00% by weight of a pigment or an equal weight in a pigment dispersion, preferably from about 3.50% by weight to about 5.50% by weight, and most preferably from about 4.00% to about 5.00% by weight of a pigment or an equal weight in a pigment dispersion of the total printing composition percentage. The printing composition includes from about 7.00% to about 11.00% by weight a polymer or an equal weight in a polymer dispersion or polymer solution, preferably from about 7.50% to about 10.50% by weight, and most preferably from about 8.00% to about 10.00% by weight of a polymer or an equal weight in a polymer dispersion or polymer solution of the total printing composition percentage. The printing composition further includes from about 13.00% to about 17.00% by weight of a co-solvent, preferably from about 13.50% to about 16.50% by weight, most preferably from about 14.00% to about 16.00% by weight of a co-solvent of the total printing composition percentage. The printing composition also includes from about 0.25% to about 2.00% by weight of a surfactant, preferably from about 0.50% to about 1.50% by weight, and most preferably about 1.00% by weight of a surfactant of the total printing composition percentage. The printing composition also includes water, such as deionized water, in addition to any water apart of any dispersion, in an amount by weight to sum to 100.00%. In an exemplary embodiment, a carrier of the pigment dispersion, and/or the polymer dispersion or the polymer solution comprises water, preferably deionized water. In an exemplary embodiment, the co-solvent is water miscible and is a solvent or a carrier.

In an exemplary embodiment, the pigment or pigment dispersion comprises Pro-Jet™ pigment APD 1000, available from FujiFilm Imaging Colorants Inc. of New Castle, Delaware. The pigment dispersions may be primary process color inks such as APD 1000 Cyan dispersion, APD 1000 Magenta dispersion, APD 1000 LF Yellow dispersion, and APD 1000 Black.

In alternative embodiments, other pigment dispersions may instead be APD 1500 Black, APD 5000 Black, or any other primary process or secondary process color, or spot color pigment compositions, such as food packaging compliant primary process color or secondary process color, such as orange, violet, and green, or spot color compositions.

In an exemplary embodiment, the polymer, polymer solution, or polymer dispersion comprises a rosin adduct ester-based component, preferably a modified rosin solution derived from Lawter™ Filtrez™ 526A, available from Lawter Inc. of Chicago, Illinois. In the present application, a rosin derived from Lawter™ Filtrez™ 526A may be mixed with ammonium hydroxide and water to create a modified rosin solution that may be applied in composition via ink jet.

In alternative embodiments, the polymer, polymer solution, or polymer dispersion may be any other food packaging compliant nonionic or anionic polymer, polymer solution, or polymer dispersion.

In an exemplary embodiment, the co-solvent may be alcohol-based, preferably 3-methoxy-3-methyl-1-butanol.

In alternative embodiments, the co-solvent may be any other co-solvent, such as a food packaging compliant co-solvent.

In an exemplary embodiment, the surfactant comprises a web wetting agent that is solvent-free. The surfactant may be a polyether modified polysiloxane compound, preferably BYK® 345.

In alternative embodiments, the surfactant may instead be another BYK® surfactants, such as BYK® 347, BYK® 348, BYK® 349 or may be another surfactant such as Dynol™ 980, or instead be any other food packaging compliant surfactant.

The overall viscosity of the printing compositions disclosed above that may be deposited via ink jet printing technologies will vary depending upon the print head(s) of the system 20. For instance, the print head(s) that deposit(s) the printing composition, such as primary process color compositions, may have a viscosity range from about 3 centipoise ("cP") to about 5 cP. The print head(s) that deposit(s) the printing composition with a color index of white may have a viscosity range from about 5 cP to about 6 cP. In an exemplary embodiment the print heads used in the system 20 are piezoelectric and have an exemplary viscosity from about 2 cP to about 10 cP, more preferably from about 3 cP to about 10 cP, and most preferably from about 5 cP to about 6 cP. A color index of white (white color index) is the lightest color and is achromatic (i.e. having no hue). Furthermore, white color index has a hue angle of about 0 degrees, a saturation of about 0%, and a brightness of about 100%. A color index of non-white (non-white color index) is any color that is not the lightest color and is not achromatic (i.e. having a hue). Additionally, non-white color index has a hue angle greater than about 0 degrees, a saturation greater than about 0%, and a brightness of less than about 100%.

Furthermore, the printing compositions disclosed above are suitable for use on a web 24 subject to dimensional modification, such as heat-shrinkable film, due to the exemplary ability to dry and/or cure at low drying temperatures up to the threshold for dimensional integrity of the web 24, while the web 24 maintains integrity and dimensions. For example, the threshold for dimensional integrity of the web 24 may be 120° F. Within the threshold for dimensional integrity of the web 24, the co-solvent in the above printing compositions is believed to have an evaporation profile that in combination with the other printing components allows for efficient drying and adherence of the printing components to the web 24. Additionally, within the threshold for dimensional integrity of the web 24, the amount of polymer, polymer solution, or polymer dispersion in the above printing compositions is believed to be stable in a larger amount when added with the co-solvent and other components in the printing compositions. The high loading of the polymer, polymer solution, or polymer dispersion in the above printing compositions is believed to allow greater adherence of the printing composition to the web 24 or coated surface without diluting or decreasing the viscosity outside the viscosity range of the print head(s) of the system 20. Additionally, the optimal drying and/or curing at such low drying temperatures allow the printing compositions to be used for variable ink jet printing with a high throughput. The throughput varies the from run to run or within a single run in the range from about 0 fpm to about 1000 fpm, most preferably about 500 fpm. The ability to use such printing compositions at varying throughput makes short-run printing operation and market-segment targeting more economically feasible.

Furthermore, once the printing compositions are applied, an optional printing composition, such as an overprint varnish, may be applied to modify the surface finish and appearance of the final imaged web.

Printing Composition 3

The printing composition may be a water-based overprint varnish applied by a flexographic or flood coating fashion to the web 24 by the fifth imager unit 82. In an exemplary embodiment of an optional printing composition, particularly for use with flexographic technology, comprises a viscosity modifier or viscosity modifier dispersion, a polymer or polymer dispersion, a surfactant, a defoamer agent or defoamer agent dispersion, a surface additive, and water. In an exemplary embodiment, a carrier of the viscosity modifier dispersion, and/or the polymer dispersion comprises water, preferably deionized water.

In an embodiment, the printing composition includes from about 1.00% to about 2.00% by weight of a viscosity modifier or an equal weight in a viscosity modifier dispersion, preferably from about 1.25% to about 1.75% by weight, most preferably about 1.50% by weight of a viscosity modifier or an equal weight in a viscosity modifier dispersion of the total printing composition percentage. The printing composition includes from about 8.00% to about 12.00% by weight of a polymer or an equal weight in a polymer dispersion, preferably from about 8.5% to about 11.50% by weight, most preferably from about 9.00% to about 11.00% by weight of a polymer or an equal weight in a polymer dispersion of the total printing composition percentage. The printing composition also includes from about 0.25% to about 2.00% by weight of a surfactant, more preferably from about 0.50% to about 1.50% by weight, and most preferably about 1.00% by weight of a surfactant of the total printing composition percentage. The printing composition further includes from about 0.15% to about 0.45% by weight of a defoamer agent or an equal weight in a defoamer agent dispersion, more preferably from about 0.20% to about 0.40% by weight, and most preferably from about 0.25% to about 0.35% by weight of a defoamer agent or an equal weight in a defoamer agent dispersion of the total printing composition percentage. The printing composition includes from about 0.35% to 0.65% by weight of a surface additive, more preferably from about 0.40% to about 0.60% by weight, and most preferably from about 0.45% by to about 0.55% by weight of a surface additive of the total printing composition percentage. The printing composition also includes water, such as deionized water, in addition to any water apart of any dispersion, in an amount by weight to sum to 100.00%.

In an exemplary embodiment, the viscosity modifier or viscosity modifier dispersion comprises methylcellulose, preferably Methocel™ A15LV, available from DuPont de Nemours, Inc. of Wilmington, Delaware.

In an alternative embodiment, the viscosity modifier or viscosity modifier dispersion may be any other viscosity modifier, such as a food packaging compliant viscosity modifier.

In an exemplary embodiment, the polymer or polymer dispersion comprises a waterborne dispersion based on vinyl acetate and ethylene, such as Vinnapas® 410, available from Wacker Chemie AG of Munich, Germany.

In an alternative embodiment, the polymer or polymer dispersion may be any other polymer or polymer dispersion, such as a food packaging compliant polymer or polymer dispersion.

In an exemplary embodiment, the surfactant comprises a web wetting agent, preferably Surfynol® 465, available from Evonik Industries of Essen, Germany.

In alternative embodiments, the surfactant may be another ethoxylated acetylenediol based surfactant, or any other surfactant such as a food packaging compliant surfactant.

In an exemplary embodiment, the defoamer agent comprises a nonionic defoamer, preferably Surfynol® DF 110L.

In alternative embodiments, the defoamer agent or defoamer agent dispersion may be any other cationic or nonionic defoamer agent or defoamer agent dispersion, such as a food packaging compliant cationic or nonionic defoamer agent or defoamer agent dispersion.

In an exemplary embodiment, the surface additive comprises a silicone containing surface additive, such as BYK®-333.

In alternative embodiments, the surface additive may be any other surface additive, such as a food packaging compliant surface additive.

Printing Composition 4

The printing composition may be a water-based overprint varnish applied by flexographic or flood coating fashion to the web 24 by the fifth imager unit 82. In an embodiment of an optional printing composition, the printing composition comprises a viscosity modifier or viscosity modifier dispersion, a polymer or polymer dispersion, a surfactant, a defoamer agent or defoamer agent dispersion, a wax additive or wax additive dispersion, a polymer modifier or polymer modifier dispersion, a polyether siloxane copolymer, and water. In an exemplary embodiment, a carrier of the viscosity modifier dispersion, polymer dispersion, defoamer agent dispersion, wax additive dispersion, and/or polymer modifier dispersion comprises water, preferably deionized water.

In an embodiment, the printing composition includes from about 1.00% to about 2.00% by weight of a viscosity modifier or an equal weight in a viscosity modifier dispersion, preferably from about 1.25% to about 1.75% by weight, most preferably about 1.50% by weight of a viscosity modifier or an equal weight in a viscosity modifier dispersion of the total printing composition percentage. The printing composition includes from about 9.00% to about 13.00% by weight of a polymer or an equal weight in a polymer dispersion, preferably from about 9.5% to about 12.50% by weight, most preferably from about 10.00% to about 12.00% by weight of a polymer or an equal weight in a polymer dispersion of the total printing composition percentage. The printing composition also includes from about 0.25% by to about 2.00% by weight a surfactant, more preferably from about 0.50% to about 1.50% by weight, and most preferably about 1.00% by weight of a surfactant of the total printing composition percentage. The printing composition includes from about 0.05% to about 0.25% by weight of a defoamer agent or an equal weight in a defoamer agent dispersion, more preferably from about 0.10% to about 0.20% by weight, and most preferably about 0.15% by weight of a defoamer agent or an equal weight in a defoamer agent dispersion of the total printing composition percentage. The printing composition includes from about 1.00% to 2.50% by weight of a wax additive, more preferably from about 1.25% to about 2.25% by weight, and most preferably from about 1.50% to about 2.00% by weight of a wax additive of the total printing composition percentage. The printing composition includes from about 0.25% to 1.75% by weight of a polymer modifier, more preferably from about 0.50% to about 1.50% by weight, and most preferably from about 0.75% to about 1.25% by weight of a polymer modifier of the total printing composition percentage. The printing composition includes from about 0.25% to 1.75% by weight of a polyether siloxane copolymer, more preferably from about 0.50% to about 1.50% by weight, and most preferably from about 0.75% to about 1.25% by weight of a polyether siloxane copolymer of the total printing composition percentage. The printing composition also includes water, such as deionized water, in addition to any water apart of any dispersion, in an amount by weight to sum to 100.00%.

In an exemplary embodiment, the viscosity modifier or viscosity modifier dispersion comprises methylcellulose, preferably Methocel™ A15LV.

In an alternative embodiment, the viscosity modifier or viscosity modifier dispersion may be any other viscosity modifier, such as a food packaging compliant viscosity modifier.

In an exemplary embodiment, the polymer or polymer dispersion comprises a waterborne dispersion based on vinyl acetate and ethylene, preferably Vinnapas® 410.

In an alternative embodiment, the polymer or polymer dispersion may be any other polymer or polymer dispersion, such as a food packaging compliant polymer or polymer dispersion.

In an exemplary embodiment, the surfactant comprises a web wetting agent, preferably Surfynol® 465.

In alternative embodiments, the surfactant may be another ethoxylated acetylenediol based surfactant such as Surfynol® 420, 440, and 485. Other surfactants, such as ethoxylated alcohol based surfactants may instead be used. Alternate embodiments may instead comprise Surfynol® 104 PG 50, or any other cationic or nonionic surfactant, such as a food packaging compliant cationic or nonionic surfactant.

In an exemplary embodiment, the defoamer agent or defoamer agent dispersion comprises an emulsion of polysiloxanes, hydrophobic solids, and emulsifiers, such as BYK®-023.

In alternative embodiments, the defoamer agent or defoamer agent dispersion may be any other cationic or nonionic defoamer agent or defoamer agent dispersion, such as a food packaging compliant cationic or nonionic defoamer agent or defoamer agent dispersion.

In an exemplary embodiment, the wax additive or wax additive dispersion comprises a wax additive of aqueous form, preferably Ultralube® E-912, available from Keim-Additec of Kirchberg, Germany.

In alternative embodiments, the wax additive or wax additive dispersion may be any other wax additive or wax additive dispersion, such as a food packaging compliant wax additive or wax additive dispersion.

In an exemplary embodiment, the polymer modifier or polymer modifier dispersion comprises an associative rheological modifier, preferably Rheolate® 212, available from Elementis of London, United Kingdom.

In alternative embodiments, the polymer modifier or polymer modifier dispersion may be any other rheological modifier, such as a food packaging compliant associative rheological modifier.

In an exemplary embodiment, the polyether siloxane copolymer comprises TEGO® Glide 410, available from Evonik Industries.

In an alternative embodiment, the polyether siloxane copolymer may be any other polyether siloxane copolymer, such as a food packaging compliant polyether siloxane copolymer.

The following examples further illustrate the disclosure but should not be construed as in any way limiting its scope.

Example 1. A printing composition useful in the present disclosure for ink jet application comprises the following formulation by weight:

a. 19.35% by weight of a pigment dispersion (Jetsperse® AQ White (AQD-PWHT)) (62% solids)

b. 19.37% by weight of a polymer dispersion (Takelac™ WPB-341) (30% solids)

c. 17.43% by weight of a co-solvent (3-methoxy-3-methyl-1-butanol)

d. 0.30% by weight of a surfactant (BYK® 345)

e. 43.55% by weight of deionized water (DI H2O)

The 43.55% DI H2O is additional deionized water to the water already used for the dispersions, such as Takelac™ WPB-341 dispersion. The total amount of deionized water throughout the printing composition is 57.12% (counting dispersion and other subcomponent water content).

Example 2. A printing composition according to the present disclosure via ink jet application has the following formulation by weight:

a. 11.20% by weight of a pigment dispersion (FujiFilm APD 1000 Cyan) (15% solids)

b. 35.00% by weight of a polymer solution (Lawter™ Filtrez™ 526A modified rosin ester) (32% solids)

c. 15.00% by weight of a co-solvent (3-methoxy-3-methyl-1-butanol)

d. 1.00% by weight of a surfactant (BYK® 345)

e. 37.80% by weight of deionized water (DI H2O)

The 37.80% DI H2O is additional deionized water to the water already used for the dispersions. The Lawter™ Filtrez™ 526A modified rosin ester had a pH of 9.00. At 25° C., the printing composition has a viscosity of 4.57 cP, a surface tension of 31.0 dynes/cm, and pH of 8.92.

Example 3. A printing composition according to the present disclosure by ink jet application has the following formulation by weight:

a. 30.00% by weight of a pigment dispersion (FujiFilm APD 1000 Magenta) (15% solids)

b. 29.00% by weight of a polymer solution (Lawter™ Filtrez™ 526A modified rosin ester) (32% solids)

c. 15.00% by weight of a co-solvent (3-methoxy-3-methyl-1-butanol)

d. 1.00% by weight of a surfactant (BYK® 345)

e. 25.00% by weight of deionized water (DI H2O)

The 25.00% DI H2O is additional deionized water to the water already used for the dispersions. The Lawter™ Filtrez™ 526A modified rosin ester had a pH of 9.00. At 25° C., the printing composition has a viscosity of 4.64 cP, a surface tension of 31.2 dynes/cm, and pH of 8.90.

Example 4. A printing composition according to the present disclosure by ink jet application has the following formulation by weight:

a. 30.00% by weight of a pigment dispersion (FujiFilm APD 1000LF Yellow) (15% solids)

b. 22.50% by weight of a polymer solution (Lawter™ Filtrez™ 526A modified rosin ester) (32% solids)

c. 15.00% by weight of a co-solvent (3-methoxy-3-methyl-1-butanol)

d. 1.00% by weight of a surfactant (BYK® 345)

e. 31.50% by weight of deionized water (DI H2O)

The 31.50% DI H2O is additional deionized water to the water already used for the dispersions. The Lawter™ Filtrez™ 526A modified rosin ester had a pH of 9.00. At 25° C., the printing composition has a viscosity of 4.56 cP, a surface tension of 31.8 dynes/cm, and pH of 8.94.

Example 5. A printing composition according to the present disclosure by ink jet application has the following formulation by weight:

a. 30.00% by weight of a pigment dispersion (FujiFilm APD 1500 Black) (15% solids)

b. 25.50% by weight of a polymer solution (Lawter™ Filtrez™ 526A modified rosin ester) (32% solids)

c. 15.00% by weight of a co-solvent (3-methoxy-3-methyl-1-butanol)

d. 1.00% by weight of a surfactant (BYK 345)

e. 28.50% by weight of deionized water (DI H2O)

The 28.50% DI H2O is additional deionized water to the water already used for the dispersions. The Lawter™ Filtrez™ 526A modified rosin ester had a pH of 9.00. At 25° C., the printing composition has a viscosity of 4.50 cP, a surface tension of 31.4 dynes/cm, and pH of 8.87.

Example 6. A printing composition useful in the present disclosure for flexographic application comprises the following formulation by weight:

a. 30.00% by weight of a viscosity modifier dispersion (Methocel™ A15LV) (5% solids)

b. 10.00% by weight of a polymer dispersion (Vinnapas 410) (55% solids)

c. 1.00% by weight of a surfactant (Surfynol® 465)

d. 1.50% by weight of a defoamer agent dispersion (Surfynol® DF 110L) (20% solids)

e. 0.50% by weight of a surface additive (BYK® 333)

f. 57.00% by weight deionized water (DI H2O)

Example 7. A printing composition useful in the present disclosure for flexographic application was prepared having the following formulation by weight:

a. 30.00% by weight of a viscosity modifier dispersion (Methocel™ A15LV) (5% solids)

b. 20.00% by weight of a polymer dispersion (Vinnapas 410) (55% solids)

c. 1.00% by weight of a surfactant (Surfynol® 465)

d. 0.80% by weight of a defoamer agent dispersion (BYK®-023) (19% solids)

e. 5.00% by weight of a wax additive dispersion (Ultralube® E-912) (35% solids)

f. 5.00% by weight of a polymer modifier dispersion (Rheolate® 212) (20% solids)

g. 1.00% by weight of a polyether siloxane copolymer (TEGO® Glide 410)

h. 37.20% by weight deionized water (DI H2O)

The 37.20% DI H2O is additional deionized water to the water already used for other. The total amount of deionized water throughout the printing composition is 82.60% (counting dispersion and other subcomponent water content).

INDUSTRIAL APPLICABILITY

In summary, the printing system 20 utilizes ink jet printing technology that improves upon the ability to print an ink jet image on a flexible/shrinkable and/or an impermeable substrate, such as a heat-shrinkable substrate that is continuously variable at a high printing throughput speed with coating(s) and/or ink(s) that are water-based and comprise food law compliant component(s) for food packaging, such as substance(s) listed in annex(es) of Swiss Ordinance RS 817.023.21.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A water-based printing composition for printing on a heat-shrinkable substrate, comprising:

from about 10.00% to about 14.00% by weight of a titanium dioxide pigment;

from about 3.00% to about 7.00% by weight of a polymer;

from about 15.00% to about 19.00% by weight of a co-solvent, wherein the co-solvent is 3-methoxy-3-methyl-1-butanol;

from about 0.20% to about 0.40% by weight of a surfactant; and at least 50.00% water;

the water-based printing composition having a surface tension of at least 31.0 dynes/cm;

wherein the co-solvent has an evaporation profile that allows drying and adherence of the printing composition applied to the heat-shrinkable substrate at a temperature up to the threshold for dimensional integrity of the heat-shrinkable substrate.

2. The printing composition of claim 1, wherein the printing composition has a viscosity from about 2 cP to about 10 cP.

3. The printing composition of claim 1, wherein the pigment is an anionic pigment or pigment dispersion with a white color index.

4. The printing composition of claim 3, wherein the pigment dispersion comprises water.

5. The printing composition of claim 1, wherein the surfactant is a silicone surfactant.

6. The printing composition of claim 5, wherein the silicone surfactant is a polyether modified polysiloxane.

7. The printing composition of claim 1, wherein the polymer is anionic.

8. The printing composition of claim 1, wherein the polymer is a waterborne polyurethane dispersion.

9. The printing composition of claim 1, wherein the at least one of the pigment, the polymer, the co-solvent, and the surfactant when applied and dried on a substrate, release amounts of chemicals under the limits specified in Swiss Ordinance RS 817.023.21 of May 2017.

10. The printing composition of claim 1, wherein the pigment, the polymer, the co-solvent, and the surfactant when applied and dried on a substrate, release amounts of chemicals under the limits specified in Swiss Ordinance RS 817.023.21 of May 2017.

11. The printing composition of claim 10, wherein the pigment, the polymer, the co-solvent, and the surfactant are Swiss Ordinance RS 817.023.21 compliant.

12. The printing composition of claim 1, wherein the printing composition is an ink jet ink.

13. A method of printing on a heat-shrinkable substrate, comprising:

providing a heat-shrinkable substrate;

applying a water-based printing composition to a surface of the substrate, the printing composition comprising from about 10.00% to about 14.00% by weight of a titanium dioxide pigment, from about 3.00% to about 7.00% by weight a of polymer, from about 15.00% to about 19.00% by weight of a co-solvent, wherein the co-solvent is 3-methoxy-3-methyl-1-butanol, from about 0.20% to about 0.40% by weight of a surfactant, and at least 50.00% water; and drying the substrate, wherein the substrate remains below a temperature such to not exceed a threshold for dimensional integrity of the substrate; the water-based printing composition having a surface tension of at least 31.0 dynes/cm;

wherein the co-solvent has an evaporation profile that allows drying and adherence of the printing composition applied to the heat-shrinkable substrate at a temperature up to the threshold for dimensional integrity of the heat-shrinkable substrate.

* * * * *